US005264367A

United States Patent [19]

Aalrust et al.

[11] Patent Number: 5,264,367

[45] Date of Patent: Nov. 23, 1993

[54] ENZYMATIC TREATMENT OF EDIBLE OILS

[75] Inventors: Erik Aalrust, Seeheim-Jugenheim; Wolfgang Beyer, Hermannsburg; Hans Ottofrickenstein, Darmstadt-Eberstadt; Georg Penk, Bad Vilbel; Hermann Plainer, Reinheim; Roland Reiner, Darmstadt, all of Fed. Rep. of Germany

[73] Assignees: Röhm GmbH, Darmstadt; Metallgesellschaft-AG, Frnakfurt am Main, both of Fed. Rep. of Germany

[21] Appl. No.: 882,710

[22] Filed: May 14, 1992

[30] Foreign Application Priority Data

May 16, 1991 [DE] Fed. Rep. of Germany ....... 4115938

[51] Int. Cl.[5] ......................... C11C 1/00; C07G 17/00

[52] U.S. Cl. .................................... 435/271; 435/262; 435/267

[58] Field of Search ................. 435/134, 262, 263, 94, 435/266, 267, 271

[56] References Cited

U.S. PATENT DOCUMENTS

| | | | |
|---|---|---|---|
| 3,522,145 | 7/1970 | Apostolatos | 435/271 |
| 4,420,560 | 12/1983 | Matsuo et al. | 435/271 |
| 4,478,856 | 10/1984 | Alder-Nissen et al. | 435/267 |
| 4,478,940 | 10/1984 | Alder-Nissen et al. | 435/262 |
| 4,698,185 | 10/1987 | Dijkstra et al. | 554/79 |
| 4,976,984 | 12/1990 | Yasukawa et al. | 426/602 |

FOREIGN PATENT DOCUMENTS

| | | |
|---|---|---|
| 0233565 | 8/1987 | European Pat. Off. . |
| 1617001 | 3/1971 | Fed. Rep. of Germany . |
| 70269 | 1/1983 | France . |
| 2-049593 | 2/1990 | Japan . |
| 2-153977 | 6/1990 | Japan . |
| 1440462 | 6/1976 | United Kingdom . |

OTHER PUBLICATIONS

Brookhaven Instruments Corporation–Product Literature for Model DCP-1000 Particle Analyzer.

The Encyclopedia of Chemistry, Third Edition, Hampel & Hawley, Van Nostrand Reinhold Company, New York 1973, pp. 687-688.

Random House Dictionary of the English Language, Random House, New York, 1967, p. 112.

Pardun, Die Pflanzenlecithine, Verlag f/ r chemische Industrie Zielkowski, Augsburg, pp. 181-194.

Pardun, Die Pflanzenlecithine, Verlag fuer chemische Industrie H. Ziolkowsky KG, Augusburg, 1988, pp. 134-145.

Chemical Abstracts 98:162804r (1982???).

*Primary Examiner*—Douglas W. Robinson
*Assistant Examiner*—Kristin Larson

[57] ABSTRACT

The content of phosphorus-containing components and the iron content of an edible vegetable or animal oil, preferably an oil such as soybean oil which has been wet-refined to remove mucilage, are reduced by enzymatic decomposition by contacting the oil with an aqueous solution of phospholipases $A_1$, $A_2$, or B and then separating the aqueous phase from the treated oil.

14 Claims, No Drawings

ENZYMATIC TREATMENT OF EDIBLE OILS

The present invention relates to a method for treating edible oils, including vegetable and animal oils, particularly oils refined to remove mucilage, to reduce their content of components containing phosphorus by enzymatic decomposition.

BACKGROUND AND FIELD OF THE INVENTION

Raw soybean oil and other raw vegetable oils are refined to remove mucilage, whereby phosphatides such as lecithin and other accompanying hydrophilic components are removed. That process may be called "wet refining to remove mucilage" if it is carried out by extraction with water. In that treatment, a part of the phosphatides is left in the oil; that part is described by the generic term "non-hydratable phosphatides" (NHP). In the production of edible oils, it is essential to remove the NHP content. It is generally believed that the phosphorus content should not exceed 5 parts per million (ppm). (See Hermann Pardun, Die Pflanzenlecithine, Verlag für chemische Industrie H. Ziolkowsky KG, Augsburg, 1988, pages 181-194).

NHP are formed by the action of enzymes inherent in the plants. In the "Alcon process", enzymes are inactivated by a treatment of soybean flakes with steam to inhibit the formation of NHP and the phosphatide content can be almost entirely removed when the raw oil is wet refined to remove mucilage.

A substantial part of the NHP can be extracted from oil which has been refined to remove mucilage by using aqueous solutions of surfactants (tensides), but, as a rule, a content below 30 ppm cannot not reached. Treatment with acids or alkalies is more successful, but requires many operational steps.

THE PRIOR ART

It is known to treat vegetable and animal oils with enzymes, whereby enzymatically cleavable components are decomposed to form water soluble substances which can then easily be extracted. For instance, DE-A 16 17 001 teaches using proteolytic enzymes for deodorizing fats used to produce soaps. In accordance with GB 1,440,462, vegetable oils are clarified using amylolytic and pectolytic enzymes. In accordance with EP-A 70 269, animal or vegetable fats or oils in a raw, partly processed, or refined state are treated with one or more enzymes in order to cleave and remove all components other than glycerides. Phosphatases, pectinases, cellulases, amylases, and proteases have been mentioned as suitable enzymes. Phospholipase C has been mentioned as an example of a phosphatase. The use of enzymes for the removal of NHP from oils previously refined to remove mucilage, also known as refining totally to remove lecithin or mucilage, is not known.

The nature of the NHP is not exactly known. In accordance with Pardun (loc.cit.), they consist of lysophosphatides and phosphatidic acids and/or calcium and magnesium salts thereof, formed when phosphatides are decomposed by the action of phospholipases which are inherently contained in plants.

SUMMARY OF THE INVENTION

It is an object of the present invention to provide an enzymatic method for decreasing the content of phosphorus- and iron-containing components in oils which have been refined to remove mucilage.

To achieve this object, it has been found that oil which has been refined to remove mucilage can be treated with phospholipase $A_1$, $A_2$, or B. Phosphorus contents below 5 ppm and iron contents below 1 ppm have been achieved. The low iron content is advantageous for the stability of the oil. The decrease in the phosphorus content is surprising because phospholipase-type enzymes have heretofore been held responsible for the formation of NHP! The objective of the process cannot be achieved with phospholipase C or D.

DESCRIPTION OF PREFERRED EMBODIMENTS

Because phospholipase $A_1$, $A_2$, or B would attack lecithin, it would make no sense to use the method of the invention on oils having a high content of lecithin, such as raw soybean oil. For this reason, the starting material preferably consists of oils which have been refined to remove mucilage and which, as a rule, contain 50 to 250 ppm of phosphorus. Oils varying in quality may be processed in the same processing plant. It is preferred to use oils which have been refined to remove mucilage, particularly sunflower seed oil, rape seed oil, and especially soybean oil. The oil need not be dried prior to treatment according to the invention.

The phospholipase is suitably employed in an aqueous solution which is emulsified in the oil to the finest possible state of division. It is believed that the enzymatic reaction takes place at the interface between the oil phase and the water phase and will be promoted by thorough mixing, such as turbulent stirring, and additionally by the addition of surfactants. The decomposition products of NHP are more hydrophilic and for this reason enter the aqueous phase and are removed from the oil together with the aqueous phase, just as are metal ions present.

Phospholipases $A_1$, $A_2$, and B are known enzymes (see Pardun, loc.cit., pages 135-141). Phospholipase $A_1$ will cleave the fatty acid ester group at the $C_1$-atom of a phospholipid molecule and is found in rat liver and in pig pancreas, for example. An enzyme having phopholipase $A_1$ activity has been isolated from mold cultures of *Rhizopus arrhizus.*

Phospholipase $A_2$, which formerly also has been described as lecithinase A, cleaves the fatty acid ester group at the 2-carbon atom of a phospholipid molecule. It is found, in most cases in association with other phospholipases, in almost all animal and plant cells. It is abundant in the venoms of rattlesnakes and cobras and in scorpion venom. It can be recovered commercially from pancreas glands after accompanying proteins, which inhibit its activity, have been decomposed with trypsin.

Phospholipase B has a widespread occurrence in nature and cleaves the second fatty acid ester residue from lysolecithin formed by the action of phospholipase $A_1$. Phospholipase B may be regarded as a mixture of phospholipases $A_1$ and $A_2$. It is found in rat liver and is produced by some molds such as *Penicillium notatum.*

Phospholipases $A_2$ and B are available as commercial products. As a rule, purified enzymes are not necessary for technical use. In the process of the invention, a phospholipase preparation recovered from ground pancreas gland pulp, and which mainly contains phospholipase $A_2$, may be used. Depending on its activity, the enzyme is used in amounts from 0.001 to 1 percent, by weight of the oil treated. A thorough distribution of the enzyme in the oil will be ensured if the enzyme is dissolved in 0.5 to 5 percent of water, by weight of the oil, and this solution is emulsified in the oil to form droplets smaller than 10 microns in diameter (weight average value). A turbulent stirring at radial velocities in excess of 100 centimeters/second has proved satisfactory. Alternatively, the oil may be circulated through a reactor by means of an external centrifugal pump. The enzymatic reaction may also be promoted by the action of ultrasonic sound.

Enzymatic action will be enhanced by the addition of an organic carboxylic acid, which may be added before or after, and preferably during, the enzyme treatment. Citric acid is preferred and may be added as the acid or as a buffer system in combination with a citrate salt, such as an alkali metal salt like sodium citrate, an alkaline earth metal salt (e.g. calcium citrate), or as the ammonium salt. Suitable quantities are 0.01 to 1 percent, by weight of the oil, optimally 0.1 percent by weight. With the acid, the pH value is adjusted to 3 to 7, preferably 4 to 6. The optimum is about pH 5. Surprisingly, that pH value will be an optimum even if the phospholipase is added as a pancreatic enzyme complex. In other processes, the pancreatic enzyme complex has an optimum pH value of 8 and is barely active at pH 5. It seems that a higher pH value prevails at the phase interface at which the enzymatic action takes place, than within the aqueous phase.

In order to dissolve phospholipases $A_1$, $A_2$, and B obtained from pancreatin or pancreas products, which contain fat, emulsifying additives are used. Water soluble emulsifiers may be employed, particularly if they have an HLB value above 9, such as sodium dodecyl sulfate. They will be effective in an amount of as little as 0.001 percent by weight of the oil, for example, if they are added to the enzyme solution before the latter is emulsified in the oil.

The addition of other enzymes, mainly proteinases and amylases, is often desirable. An addition of proteins may also be desirable because they have a certain surfactant activity.

The temperature during the enzyme treatment is not critical. Temperatures between 20° C. and 80° C. are suitable. A temperature of 50° C. is optimal, but a short heating up to 70° C. is permissible. The duration of the treatment will depend on temperature and may be shorter at higher temperatures. As a rule, treatment times from 0.1 to 10 hours, preferably 1 to 5 hours, are sufficient. A stepwise program, in which the first step is carried out at a temperature of 40° C. to 60° C. and the second step at a higher temperature in the range from 50° C. to 80° C., has proved particularly satisfactory. For instance, the reaction batch may first be stirred at 50° C. for 5 hours and then at 75° C. for one hour.

After termination of the treatment, the enzyme solution, together with the NHP decomposition products taken up in it, is separated from the oil phase, preferably by centrifugation. Because the enzymes have a high stability and the amount of the decomposition products which have been taken up is small, the same enzyme solution can be reused several times.

The process is preferably carried out continuously. In a desirable continuous mode of operation, the oil is emulsified in with the enzyme solution in a first mixing vessel, then reacted with turbulent agitation, optionally at increasing temperature, in one or more succeeding reaction vessels. The aqueous enzyme solution is subsequently separated in a centrifuge. To avoid enrichment of the decomposition products in the enzyme solution, part of the enzyme solution may continuously be replaced by fresh enzyme solution while the remainder is recycled to the process.

Because the oil which is recovered contains less than 5 ppm of phosphorus, it is adaptable to be physically refined to edible oil. Because the iron content has been lowered, there is a good chance that the refined product will have a high resistance to oxidation.

A better understanding of the present invention and of its many advantages will be had be referring to the following Examples, given by way of illustration.

EXAMPLE 1

One liter of soybean oil which has been wet refined to remove mucilage and which contains 130 ppm of residual phosphorus is heated to 50° C. in a Florence flask. 0.1 g of a pure phospholipase $A_2$ having an activity of 10,000 units/g (1 phospholipase $A_2$ unit liberates 1 micromole of fatty acid per minute from egg yolk at 40° C. and pH 8), 1 g of sodium citrate, and 20 g of sodium dodecyl sulfate are dissolved in 33.3 g of water and the solution is emulsified in the oil to form droplets 0.1 micron in diameter. For this purpose, the oil is circulated about 3 times per minute by an external centrifugal pump. After treatment for 3 hours, a sample removed by centrifugation is found to have an NHP content of 34 ppm of phosphorus. After increasing the temperature to 75° C. and continuing the treatment for one further hour, the NHP content has decreased to 3 ppm P. The oil which has thus been treated can now be subjected to physical refining.

EXAMPLE 2

The process according to Example 1 is repeated with the difference that the phospholipase $A_2$ is replaced by 1 g of a phospholipase B preparation from Corticium species (available from Amano Pharmaceutical Co., Ltd., Nagoya, Japan as an experimental product without activity data). The phosphorus content of soybean oil is reduced below 1 ppm.

CONTROL EXPERIMENTS

The process of Example 1 is repeated with the difference that phospholipase $A_2$ is replaced by 1 g of a phospholipase C preparation (available from Amano Pharmaceutical Co., Ltd. as an experimental product without activity data.) The phosphorus content of the soybean oil is decreased only to 45 ppm.

Using 1 g of a phospholipase D preparation having an activity of 1250 phospholipase units/g (Sigma Chemie GmbH, Deisenhofen, Germany), a phosphorus content of 48 ppm was reached. The use of 1 g of an acid phosphatase (Sigma Chemie GmbH, Deisenhofen, Germany) gave a phosphorus content of 47 ppm.

Approximately the same phosphorus content is found if the process is carried out without the addition of an enzyme.

EXAMPLE 3

One liter of soybean oil which has been wet refined to remove mucilage and which contains 110 ppm of residual phosphorus is heated to 75° C. in a Florence flask. While vigorously stirring at 700 rpm with a blade mixer 5 cm in diameter, 10 ml of water containing 1 g of citric acid are added, and the stirring is then continued for 1 hour. This is followed by cooling to 40° C. and the addition of a solution of 0.1 g of phospholipase $A_2$ of the quality mentioned in Example 1 and 50 mg of calcium chloride in 20 ml of a 0.1 molar acetate buffer solution at a pH value of 5.5. After further intense stirring for 5 hours, the aqueous phase is removed by centrifugation. The resulting oil contains 2 ppm of phosphorus and is suitable for physical refining. The changes in the other parameters are apparent from the following Table.

| | Starting Oil | Treated Oil |
|---|---|---|
| Phosphorus | 110 ppm | 2 ppm |
| Iron | 3.3 ppm | <0.1 ppm |
| Calcium | 65.4 ppm | 5.3 ppm |
| Magnesium | 38.4 ppm | <0.1 ppm |
| Peroxide value | 18.3 | 18.50 |
| Acid value | 0.91 | 1.10 |
| Saponification number | 191.2 | 190.4 |

EXAMPLE 4

The process according to Example 3 is repeated with the difference that phospholipase $A_2$ is replaced by 1 g of a pancreas preparation (pancreatin, 800 phospholipase units/g). The preparation contains phospholipase $A_2$, proteinase, amylase, and lipase. The phosphorus content decreases below 1 ppm. The acid value is increased only slightly from 0.91 to 1.49 under the action of the lipase.

EXAMPLE 5

9 liters of rape seed oil, wet refined to remove mucilage and having a phosphorus content of 72 ppm, is mixed with a solution of 8.6 g of citric acid in 250 ml of water and heated to 60° C. The mixture is homogenized by recirculating once per minute with an external circulatory pump. Then the pH value of the aqueous phase is adjusted to 5.0 with 30 g of a 10 percent solution of sodium hydroxide. 9 g of phospholipase $A_2$ having an activity of 400 U/g are added together with some calcium chloride and the mixture is recirculated as described above for 3 hours at 60° C.

After recovery of the oil by centrifugation, a phosphorus content of 3 ppm is found.

EXAMPLE 6

The procedure of Example 5 is repeated with the difference that raw sunflower seed oil, which has not been wet refined to remove mucilage and which has a wax content of 1.64 percent by weight, is used. The phosphorus content is decreased by the treatment from 223 to 3 ppm.

What is claimed is:

1. A method for reducing the content of phosphorus-containing components in an edible oil from which mucilage has previously been removed and which has a phosphorus content from 50 to 250 parts per million, which method comprises contacting said oil at a pH from 4 to 6 with an aqueous solution of a phospholipase $A_1$, phospholipase $A_2$, or phospholipase B which is emulsified in the oil until the phosphorus content of the oil is reduced to less than 5 parts per million, and then separating the aqueous phase from the treated oil.

2. A method as in claim 1 wherein mucilage has previously been removed from said oil by wet refining.

3. A method as in claim 1 wherein citric acid or a buffer comprising citric acid and a salt thereof is additionally present during said contacting.

4. A method as in claim 1 wherein an emulsifier is additionally present during said contacting.

5. A method as in claim 1 wherein said contacting is effected at a temperature from 20° C. to 80° C.

6. A method according to claim 1 wherein said contacting is effected in two steps, a first step performed at 40° C. to 60° C., and a second step performed at a higher temperature from 50° C. to 80° C.

7. A method as in claim 1 wherein the oil is soya bean oil.

8. A method as in claim 1 wherein the oil is rape seed oil.

9. A method as in claim 1 wherein the oil is sunflower oil.

10. A method as in claim 1 wherein the aqueous enzyme solution is reused after separation from the treated oil.

11. A method as in claim 1 which is performed batchwise.

12. A method as in claim 1 which is performed continuously.

13. A method as in claim 1 wherein the aqueous solution of phospholipase $A_1$, phospholipase $A_2$, or phospholipase B is dispersed in the oil as droplets having a weight average diameter less than 10 microns.

14. A method according to claim 1 wherein oil having an iron content is contacted with an aqueous solution of a phospholipase $A_1$, phospholipase $A_2$, or phospholipase B, and said iron content is reduced, as well as the content of phosphorus-containing components.

* * * * *